(12) United States Patent
Roberts et al.

(10) Patent No.: US 10,629,239 B1
(45) Date of Patent: *Apr. 21, 2020

(54) COMPUTING SYSTEM WITH DVE TEMPLATE SELECTION AND VIDEO CONTENT ITEM GENERATION FEATURE

(71) Applicant: Gracenote, Inc., Emeryville, CA (US)

(72) Inventors: Dale T. Roberts, Santa Monica, CA (US); Michael Gubman, Oakland, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,943

(22) Filed: Dec. 20, 2018

Related U.S. Application Data

(63) Continuation of application No. 15/868,927, filed on Jan. 11, 2018, now Pat. No. 10,199,071, which is a continuation of application No. 15/209,515, filed on Jul. 13, 2016, now Pat. No. 9,905,267.

(51) Int. Cl.
| | |
|---|---|
| *H04N 9/80* | (2006.01) |
| *G11B 27/036* | (2006.01) |
| *G06K 9/00* | (2006.01) |
| *H04N 21/234* | (2011.01) |
| *H04N 21/854* | (2011.01) |
| *H04N 5/93* | (2006.01) |
| *G11B 27/00* | (2006.01) |

(52) U.S. Cl.
CPC ........ *G11B 27/036* (2013.01); *G06K 9/00744* (2013.01); *G06K 9/00758* (2013.01); *H04N 21/23418* (2013.01); *H04N 21/854* (2013.01)

(58) Field of Classification Search
USPC .................................................. 386/248, 278
See application file for complete search history.

(56) References Cited

U.S. PATENT DOCUMENTS

| | | | |
|---|---|---|---|
| 8,838,609 B1 | 9/2014 | Sharifi et al. | |
| 10,140,880 B2 * | 11/2018 | Wang | G09B 5/02 |
| 10,452,713 B2 * | 10/2019 | Liu | G06F 16/7867 |

(Continued)

OTHER PUBLICATIONS

Roberts, Dale T., U.S. Appl. No. 15/209,490, filed Jul. 13, 2016.

(Continued)

*Primary Examiner* — Nigar Chowdhury
(74) *Attorney, Agent, or Firm* — McDonnell Boehnen Hulbert & Berghoff LLP

(57) ABSTRACT

In one aspect, an example method includes (i) receiving a first group of video content items; (ii) identifying from among the first group of video content items, a second group of video content items having a threshold extent of similarity with each other; (iii) determining a quality score for each video content item of the second group; (iv) identifying from among the second group of video content items, a third group of video content items each having a quality score that exceeds a quality score threshold; and (v) based on the identifying of the third group, transmitting at least a portion of at least one video content item of the identified third group to a digital video-effect (DVE) system, wherein the system is configured for using the at least the portion of the at least one video content item of the identified third group to generate a video content item.

22 Claims, 8 Drawing Sheets

(56) References Cited

U.S. PATENT DOCUMENTS

| | | |
|---|---|---|
| 2006/0068818 A1* | 3/2006 | Leitersdorf ............ H04H 20/18 455/466 |
| 2009/0320078 A1 | 12/2009 | Pulver |
| 2010/0115554 A1 | 5/2010 | Drouet et al. |
| 2011/0217019 A1* | 9/2011 | Kamezawa .......... H04N 9/8042 386/224 |
| 2011/0249958 A1* | 10/2011 | Fujita ................... G11B 27/034 386/280 |
| 2013/0340006 A1 | 12/2013 | Kwan |
| 2014/0140675 A1 | 5/2014 | de Sa et al. |
| 2014/0186004 A1 | 7/2014 | Hamer |
| 2016/0286244 A1 | 9/2016 | Chang et al. |
| 2016/0373496 A1 | 12/2016 | Yamagishi |

OTHER PUBLICATIONS

Non-Final Office Action dated May 18, 2017, issued in connection with U.S. Appl. No. 15/209,490, filed Jul. 13, 2016, 29 pages.

Final Office Action dated Oct. 5, 2017, issued in connection with U.S. Appl. No. 15/209,490, filed Jul. 13, 2016, 36 pages.

* cited by examiner

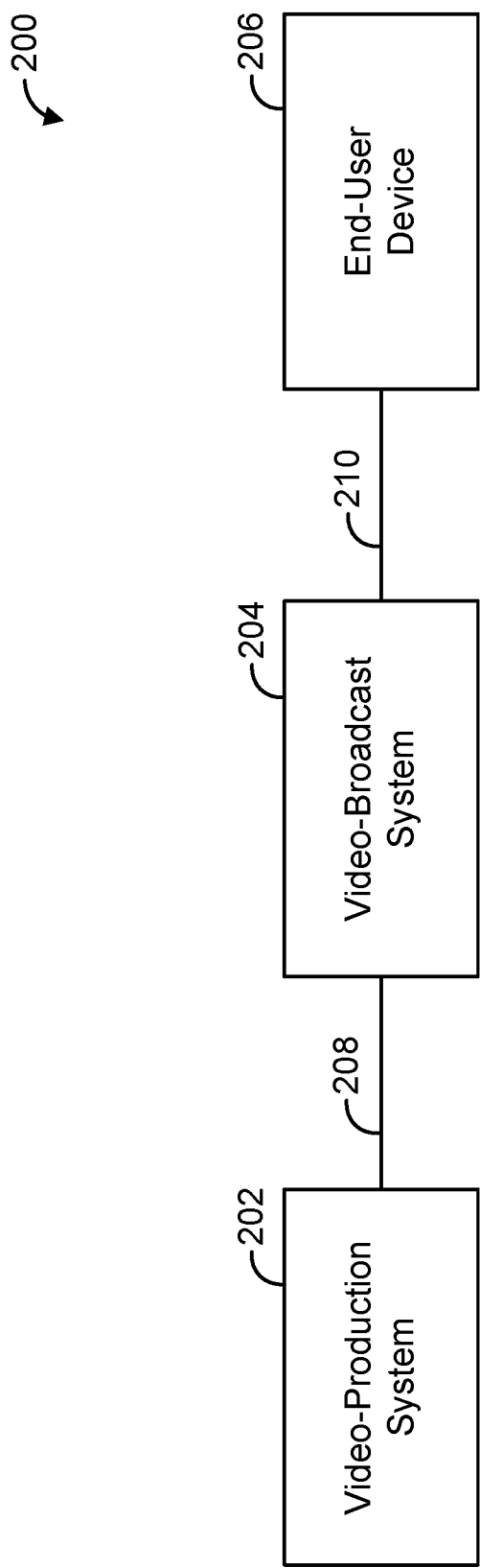

| Story Title | Video-Content Item Identifier | Duration | DVE Identifier |
|---|---|---|---|
| STORY A | VS ID A | 00:02:00:00 | DVE ID A |
| STORY B | VS ID B | 00:01:30:00 | |
| STORY C | | 00:00:30:00 | DVE ID C |
| STORY D | VS ID D | 00:00:30:00 | |
| STORY E | VS ID E | 00:00:30:00 | |
| COMMERCIAL BREAK | | | |
| STORY F | VS ID F | 00:02:00:00 | DVE ID F |
| STORY G | | 00:01:30:00 | DVE ID G |
| STORY H | VS ID H | 00:00:30:00 | |
| STORY I | VS ID I | 00:00:30:00 | |

Figure 5

COMPUTING SYSTEM WITH DVE TEMPLATE SELECTION AND VIDEO CONTENT ITEM GENERATION FEATURE

REFERENCE TO RELATED APPLICATIONS

This disclosure is a continuation of U.S. patent application Ser. No. 15/868,927, filed Jan. 11, 2018, which is a continuation of U.S. patent application Ser. No. 15/209,515 (now U.S. Pat. No. 9,905,267), filed Jul. 13, 2016. The entirety of each of these earlier applications is hereby incorporated by reference.

USAGE AND TERMINOLOGY

In this disclosure, unless otherwise specified and/or unless the particular context clearly dictates otherwise, the terms "a" or "an" means at least one, and the term "the" means the at least one.

BACKGROUND

Unless otherwise specified, the materials described in this section are not prior art to the claims in this disclosure and are not admitted to be prior art by inclusion in this section.

A video-production system (VPS) can generate and/or output a video program (e.g., a news program) in the form of video content. The VPS can include various components to facilitate this. For example, the VPS can include a scheduling system, which can create and/or edit a program schedule, perhaps based on input received from a user (e.g., a producer or technical director) via a user interface. Further, the VPS can include a sequencing system, which can process records in the program schedule, and based on the processed records, control one or more components of the VPS to facilitate generating and/or outputting video content.

SUMMARY

In one aspect, an example method is disclosed. The method includes receiving, by a computing system, a first group of video content items; identifying, by the computing system, from among the first group of video content items, a second group of video content items having a threshold extent of similarity with each other; determining, by the computing system, a quality score for each video content item of the second group; identifying, by the computing system, from among the second group of video content items, a third group of video content items each having a quality score that exceeds a quality score threshold; and based on the identifying of the third group, transmitting, by the computing system, at least a portion of at least one video content item of the identified third group to a digital video-effect (DVE) system, wherein the DVE system is configured for (i) receiving the transmitted at least the portion of the at least one video content item of the identified third group, and (ii) using (a) the received at least the portion of the at least one video content item of the identified third group and (b) a DVE template, to generate a video content item.

In another aspect, an example non-transitory computer-readable medium is disclosed. The computer-readable medium has stored thereon program instructions that upon execution by a processor, cause performance of a set of acts including receiving, by a computing system, a first group of video content items; identifying, by the computing system, from among the first group of video content items, a second group of video content items having a threshold extent of similarity with each other; determining, by the computing system, a quality score for each video content item of the second group; identifying, by the computing system, from among the second group of video content items, a third group of video content items each having a quality score that exceeds a quality score threshold; and based on the identifying of the third group, transmitting, by the computing system, at least a portion of at least one video content item of the identified third group to a DVE system, wherein the DVE system is configured for (i) receiving the transmitted at least the portion of the at least one video content item of the identified third group, and (ii) using (a) the received at least the portion of the at least one video content item of the identified third group and (b) a DVE template, to generate a video content item.

In another aspect, an example computing system is disclosed. The computing system is configured for performing a set of acts including receiving, by a computing system, a first group of video content items; identifying, by the computing system, from among the first group of video content items, a second group of video content items having a threshold extent of similarity with each other; determining, by the computing system, a quality score for each video content item of the second group; identifying, by the computing system, from among the second group of video content items, a third group of video content items each having a quality score that exceeds a quality score threshold; and based on the identifying of the third group, transmitting, by the computing system, at least a portion of at least one video content item of the identified third group to a digital video-effect (DVE) system, wherein the DVE system is configured for (i) receiving the transmitted at least the portion of the at least one video content item of the identified third group, and (ii) using (a) the received at least the portion of the at least one video content item of the identified third group and (b) a DVE template, to generate a video content item.

In another aspect, an example method is disclosed. The method includes receiving, by a computing system, a first group of video content items; identifying, by the computing system, from among the first group of video content items, a second group of video content items each having a quality score that exceeds a quality score threshold; and based on the identifying, using, by the computing system, at least a portion of at least one video content item of the identified second group to generate a video content item.

In another aspect, an example non-transitory computer-readable medium is disclosed. The computer-readable medium has stored thereon program instructions that upon execution by a processor, cause performance of a set of acts including receiving, by a computing system, a first group of video content items; identifying, by the computing system, from among the first group of video content items, a second group of video content items each having a quality score that exceeds a quality score threshold; and based on the identifying, using, by the computing system, at least a portion of at least one video content item of the identified second group to generate a video content item.

In another aspect, an example computing system is disclosed. The computing system is configured for performing a set of acts including receiving, by a computing system, a first group of video content items; identifying, by the computing system, from among the first group of video content items, a second group of video content items each having a quality score that exceeds a quality score threshold; and based on the identifying, using, by the computing system, at least a portion of at least one video content item of the identified second group to generate a video content item.

BRIEF DESCRIPTION OF THE DRAWINGS

FIG. 2 is a simplified block diagram of an example video system.

FIG. 5 is a simplified block diagram of an example program schedule.

DETAILED DESCRIPTION

I. Overview

In recent years, the quantity and capability of computing devices that can capture and transmit video content has increased. Because more end-users have these types of computing devices (mobile phones, cameras, smartwatches, head-mounted devices, etc.), end-users may have more power to document and record events as they unfold. Given this, a VPS can enhance the production of video content by incorporating into produced video content, input video content received from end-users at events as they happen. However, incorporating input video content in this manner can present several challenges.

One challenge can involve determining which of multiple input video content items relate to a common event. Another challenge can involve ensuring that an input video content item has an appropriate quality for viewing. Another challenge can involve selecting a DVE template that can accommodate multiple input video content items. Accordingly, a system and method are described that can address these and/or other challenges.

In one example, a method can begin by receiving at a computing system a first group of video content items. The computing system can receive video content items from various video sources. The computing system can then identify a second group of video content items from the first group that have a threshold extent of similarity with each other. In one example, the computing system can compare metadata and/or fingerprints to determine whether video content items are sufficiently similar.

The computing system can then determine a quality score for each video content item in the second group of video content items. The quality score can correspond with a characteristic of the video content items or corresponding audio content items (e.g., stability of the video, resolution of the video, audio quality, or other characteristics of the video). The computing system can identify from among the second group a third group of video content items each having a quality score that exceeds a quality score threshold. The threshold may be adjusted by the computing system to reduce or increase the quantity of the third group of video content items.

The computing system can then select a DVE template to use based on the number of video content items in the third group. The computing system can then use the selected DVE template and the third group of video content items to generate a video content item for broadcast, and can then broadcast the generated video content item. The generated video content item can be broadcast within a time period (e.g., 10 seconds) from when the received video content items were received and/or captured to provide "live" coverage of the event. In this way, the computing system can produce video content that incorporates multiple video content items captured and provided by end-users at an event as it unfolds.

II. Example Architecture

A. Computing Device

Figure 1:
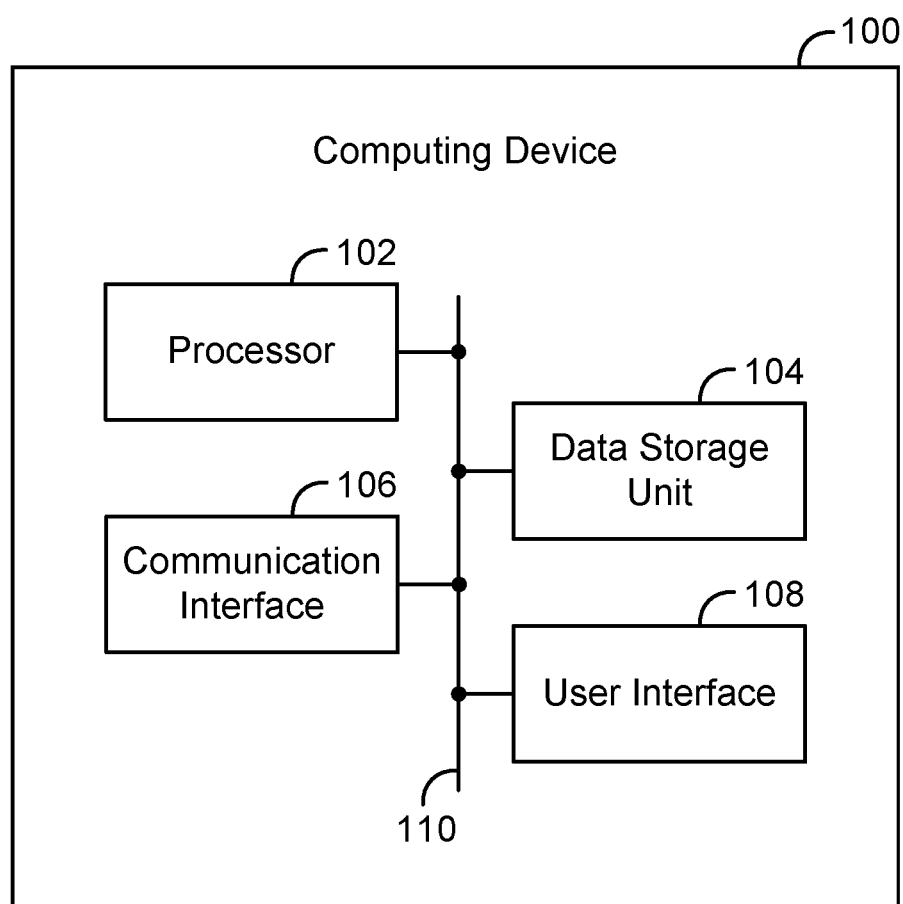
FIG. 1 is a simplified block diagram of an example computing device.

FIG. 1 is a simplified block diagram of an example computing device 100. Computing device 100 can include various components, such as processor 102, data storage unit 104, communication interface 106, and/or user interface 108. Each of these components can be connected to each other via connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, upon execution by processor 102, cause computing device 100 to perform one or more acts and/or functions, such as those described in this disclosure. As such, computing device 100 can be configured to perform and/or can perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect with and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can include hardware and/or software components that facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

Computing device 100 can take various forms, such as a workstation terminal, a desktop computer, a laptop, a tablet, and/or a mobile phone.

B. Video System

FIG. 2 is a simplified block diagram of an example video system 200. Video system 200 can perform various acts and/or functions related to video content, and can be implemented as a computing system. In this disclosure, the term "computing system" means a system that includes at least one computing device. In some instances, a computing system can include one or more other computing systems.

Video system 200 can include various components, such as VPS 202, video-broadcast system (VBS) 204, and destination device 206, each of which can be implemented as a computing system. Video system 200 can also include connection mechanism 208, which connects VPS 202 with VBS 204; and connection mechanism 210, which connects VBS 204 with destination device 206.

Figure 3A:
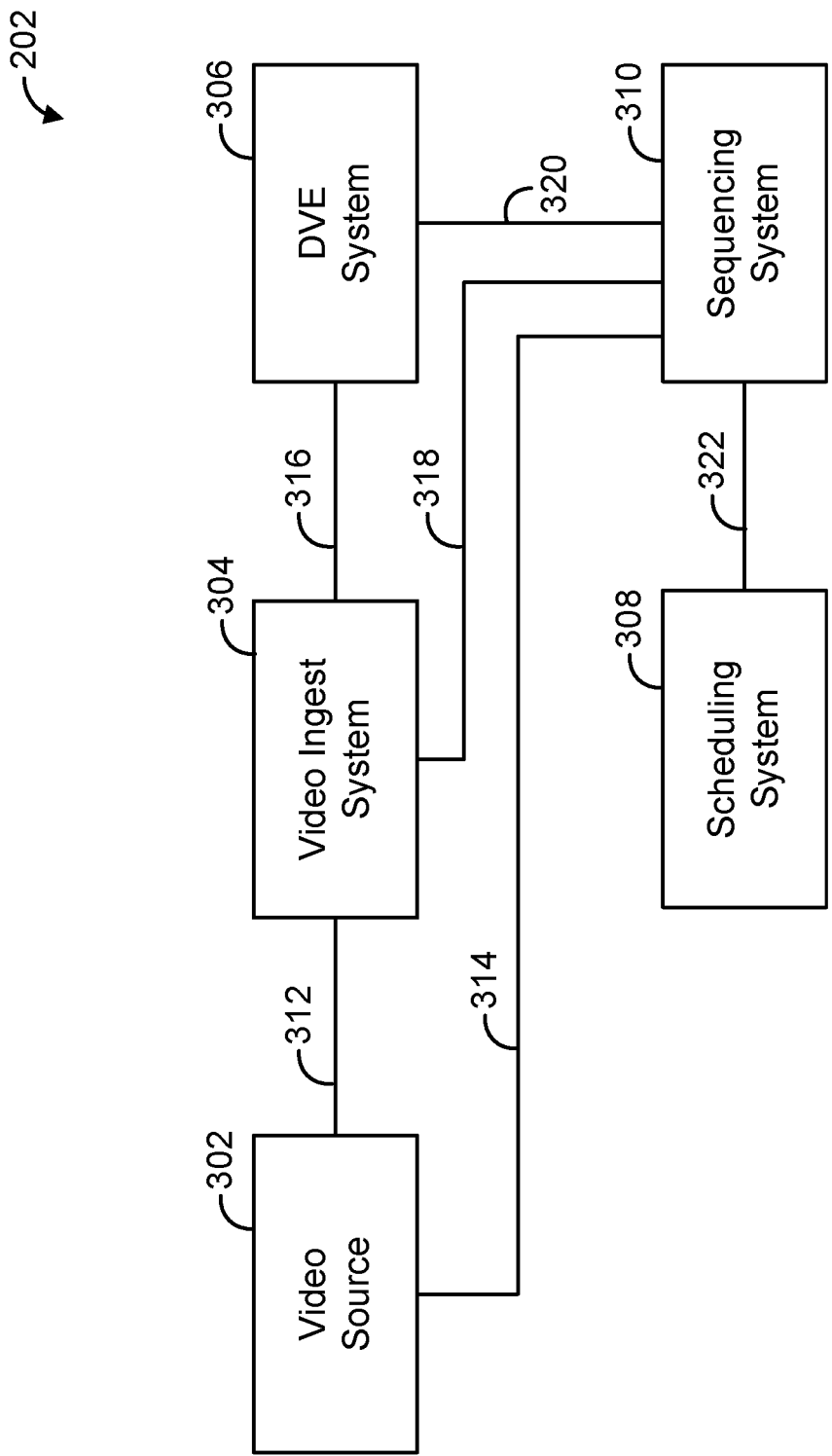
FIG. 3A is a simplified block diagram of an example VPS.

FIG. 3A is a simplified block diagram of an example VPS 202. VPS 202 can include various components, such as video source 302, video ingest system 304, DVE system 306, scheduling system 308, and sequencing system 310, each of which can be implemented as a computing system. VPS 202 can also include connection mechanism 312, which connects video source 302 with video ingest system 304; connection mechanism 314, which connects video source 302 with sequencing system 310; connection mechanism 316, which connects video ingest system 304 with DVE system 306; connection mechanism 318, which connects video ingest system 304 with sequencing system 310; connection mechanism 320, which connects DVE system 306 with sequencing system 310; and connection mechanism 322, which connects scheduling system 308 with sequencing system 310.

Video source 302 can take various forms, such as a character generator, a video server, a satellite receiver, a DVE system, or a video camera (e.g., a security camera or a camera provided at a facility such as a stadium, arena, or building). An example character generator is the Viz Trio provided by Viz Rt™ of Bergen, Norway. An example video server is the K2 server provided by Grass Valley™ of San Francisco, Calif. Video source 302 can also take the form of an end-user device such as a mobile phone or tablet.

DVE system 306 can take various forms, such as a production switcher. An example production switcher is the Vision Octane production switcher provided by Ross Video Ltd. of Iroquois, Ontario in Canada. In some instances, DVE system 306 can take the form of an end-user device.

Figure 3B:
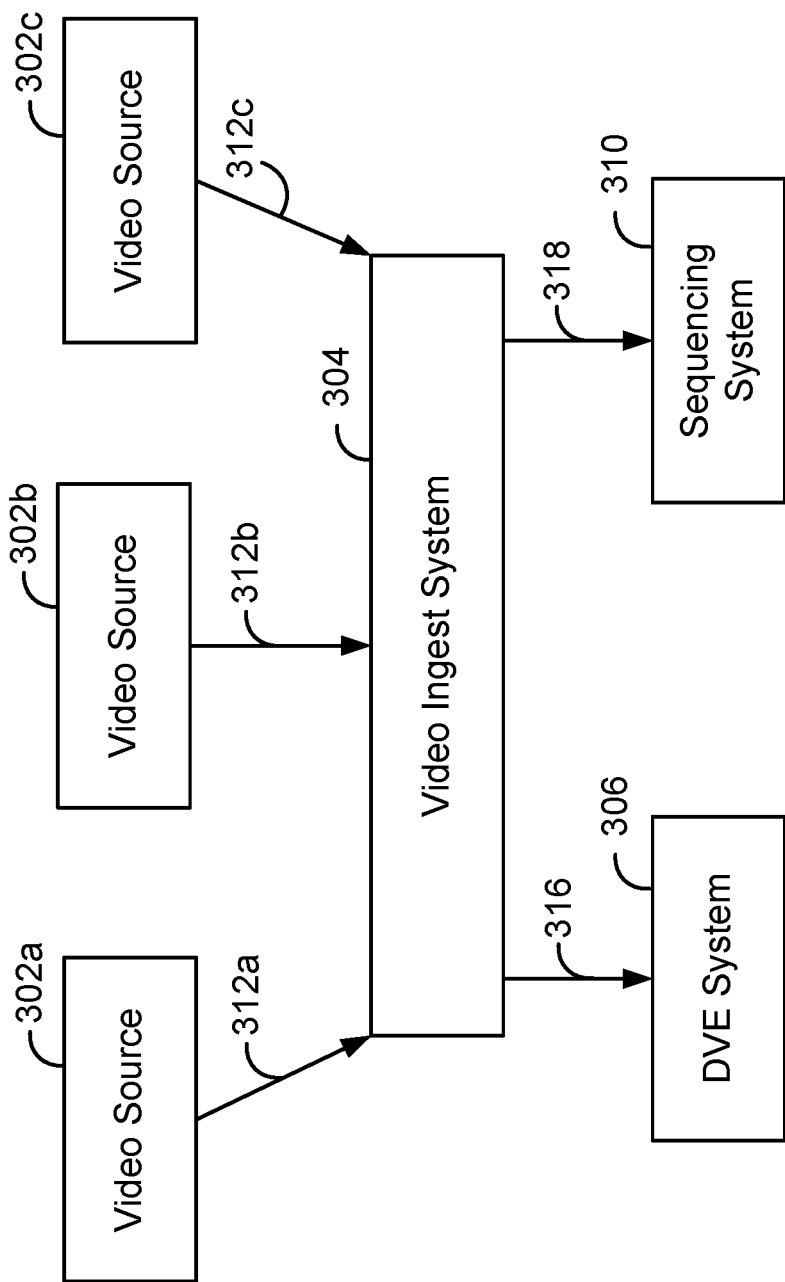
FIG. 3B is a simplified block diagram of another example VPS.

FIG. 3B is a simplified block diagram of a version of VPS 202, where VPS 202 includes three video sources, namely video source 302a, video source 302b, and video source 302c, and respective connection mechanisms 312a-c that connect the video sources 302a-c with the video ingest system 304.

Returning to FIG. 2, VBS 204 can include various components, such as a terrestrial antenna or a satellite, each of which can be implemented as a computing system.

Each of the video-based entities described in this disclosure can include or be integrated with a corresponding audio-based entity. Likewise, the video content described in this disclosure can include or be integrated with corresponding audio content.

III. Example Operations

Video system 200 and/or components thereof can perform various acts and/or functions. These and related features will now be described.

Video system 200 can perform various acts and/or functions related to video content. For example, video system 200 can receive, generate and/or output a video program in the form of video content. In this disclosure, the act of receiving, generating, and/or transmitting video content can occur in various ways and/or according to various standards. For example, the act of receiving and/or transmitting video content can include receiving and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, and/or transmitting video content can include receiving, generating, and/or transmitting an encoded or decoded version of the video content.

VPS 202 can perform various acts and/or functions related to video content production. In this context, video source 302 can generate and/or output video content, and can transmit the video content to video ingest system 304 and/or DVE system 306. As noted above, video source 302 can take the form of a character generator. A character generator can generate video content based on input data. For example, a character generator can receive weather data and then generate video content that includes the weather data. As another example, a character generator can use an ordered set of content items to generate video content that includes the content items in the specified order. This type of generated video content is sometimes referred to in the industry as a "ticker." The content items can include various types of content, such as text and/or images. The ordered set of content items can be stored in various forms, such as in the form of an extended markup Language (XML) file.

As also noted above, video source 302 can also take the form of a video server. A video server can store video content (e.g., in the form of a file). Further, the video server can use the stored video content to generate a video stream representing the video content. This is sometimes referred to in the industry as the video server playing out the video content. The video server can then transmit the video stream, thereby transmitting the video content.

In some instances, such as where video source 302 is an end-user device, video source 302 can capture and transmit video content (and perhaps related data, such as metadata) to video ingest system 304. Video ingest system 304 can then perform various operations based on or in connection with the received video content.

In one example, video source 302 can transmit video content to video ingest system 304 shortly after the video content has been captured to enable the captured video content to be broadcast "live." In some embodiments, the captured video content can be broadcast within 10 seconds from when the video content was captured by video source 302 and/or received by the video ingest system 304.

Referring to FIG. 3B, in one example, video ingest system 304 can receive a first video content item from video source 302a, a second video content item from video source 302b, and a third video content item from video source 302c. In one example, two or more of video sources 302a-c can be end-user devices that are on-site at a newsworthy event.

Video ingest system 304 can include various modules, such as a metadata module, a fingerprint module, a filtering module, a comparison module, and a scoring module. The metadata module can determine and/or store metadata for a received video content item. Metadata can be stored at video ingest system 304 and later retrieved by the filtering module and/or the comparison module. The metadata can include information about the video content item, such as the date and time of capture, duration, geographic location, camera information, quality of the video content, venue information, network signal information, user information, user input, and/or other information.

A fingerprint can uniquely identify a video content item and can be generated using techniques in the art that are now know or later discovered. In some embodiments, the fingerprint module can generate and/or store fingerprints associated with video content items received from video sources 302a-c. In one example, a fingerprint associated with a video content item can be a video fingerprint that is generated based on the video content item. In another example, a fingerprint associated with a video content item can be an audio fingerprint that is generated based on an audio content item that corresponds to the video content item. Fingerprints can be stored at video ingest system 304 and later retrieved by the filtering module and/or the comparison module.

The filtering module can filter a video content item to remove a portion of unwanted video content. For example, the filtering module can remove video content that is inappropriate (e.g., video content containing profanity, vulgar content, etc.). The filtering module can also remove video content of poor quality (e.g., unstable video, grainy video, video data that is too dark or too bright, etc.). The filtering module can rely on metadata, fingerprints, or both to determine video content to filter out.

The comparison module can determine which of multiple video content items are related to the same topic or event. In one example, the comparison module can identify from among the first group of video content items a second group of video content items relating to the same topic or event. The comparison module can do this by identifying from among the first group of video content items a second group of video content items having a threshold extent of similarity with each other.

For example, video ingest system 304 can receive two video content items representing a hockey game and one video content item representing a basketball game. The comparison module can group all three video content items into a first group. The comparison module can then identify a second group of video content items containing just the two video content items representing the hockey game. The comparison module can do this by determining that the two video content items representing the hockey game have a threshold extent of similarity with each other.

In one example, the comparison module can determine whether video content items have a threshold extent of similarity with each other by comparing fingerprints and/or metadata associated with the video content items. As noted above, a video content item can be associated with a fingerprint (e.g., a fingerprint generated based on the video content item, or a fingerprint generated based on an audio content item that corresponds to the video content item). Upon generating a fingerprint associated with a given video content item according to a selected fingerprinting generation scheme, that fingerprint can be compared with another fingerprint generated based on another video content item according to the same scheme, and a matching one of those fingerprints can be identified based on such comparison. The comparison module can be configured to match two (or perhaps more) fingerprints by determining whether one of fingerprints matches or has a threshold extent of similarity with the other fingerprint.

In some instances, a fingerprint can include query sub-fingerprints that have been generated from segments of a portion of the respective video content item. As such, comparing the fingerprints can involve computing distances between fingerprints and/or sets of sub-fingerprints. For example, a vector distance between fingerprints may be computed based on comparisons of respective bits of two fingerprints. Moreover, a distance may be computed based on comparisons between each of a set of query sub-fingerprints and reference sub-fingerprints having a relative timing relationship that corresponds to the query sub-fingerprints.

In some cases, a number of selection heuristics can be applied to evaluate the quality of a match, including comparing the fingerprint distance with a threshold, and analyzing an extent of correspondence of any available metadata associated with the video content items being compared. In some cases, the evaluation of the quality of the match can involve generating a similarity score based on a combination of the selection heuristics, and comparing the similarity score to a threshold, to determine whether two (or perhaps more) video content items have a threshold extent of similarity with each other.

Other example techniques for determining whether two video content items have a threshold extent of similarity with each other are described in U.S. Pat. App. Pub. No. 2014/0193027 entitled "Search and Identification of Video Content," which is assigned to the assignee of the present disclosure, and which is hereby incorporated by reference herein in its entirety.

Returning to the example concerning hockey and basketball games discussed above, in one example, the comparison module can initially group the first video content item (representing the hockey game) and the third video content item (representing the basketball game) in the first group, and can group the second video content item (representing the hockey game) in the second group. Next, the comparison module can compare fingerprints and/or metadata of the first and third video content items (in the first group) with fingerprints and/or metadata of the second video content item (in the second group).

Based on this comparison, the comparison module can determine that the first video content item (representing the hockey game) has a threshold extent of similarity with the second video content item (representing the hockey game). Thus, the comparison module can add the first video content item to the second group of video content items. Additionally, the comparison module can determine that the third video content item (representing the basketball game) does not have a threshold extent of similarity with the second video content item. Therefore, the comparison module may not add the third video content item to the second group.

After the comparison module has identified the second group of video content items, the scoring module can determine a quality score for each video content item in the second group of video content items. The quality score can be determined based on one or more characteristics of a video content item. In one example, the quality score can be determined based on the stability of the video. In another example, the quality score can correspond to a "blur" score. The quality score can be higher if the video content item is less blurry and/or shaky. For example, in the second group of video content items that includes the first and second video content items representing hockey games, the scoring module can determine that the second video content item has a higher quality score than the first video content item because the second video content item is less blurry or shaky than the first video content item. Other characteristics that may be used to determine the quality score include the resolution of the video content item, quality of a corresponding audio content item, color contrast, brightness, whether the colors of a video content item are too dark, and/or other characteristics associated with a video content item. In some examples, the quality score can be determined based on a combination of characteristics associated with a video content item.

After determining quality scores of the video content items of the second group, the scoring module can identify a third group of video content items from the second group. The scoring module can determine the third group of video content items as video content items from the second group that have a quality score exceeding a quality score threshold. In some examples, the quality score threshold can be adjusted higher to reduce the number of video content items selected for the third group. Alternatively, the quality score threshold can be adjusted lower to increase the number of video content items selected for the third group.

In one example, the scoring module can identify the video content item of the second group having the highest quality score and select that video content item for the third group. For example, the scoring module can identify the third group of video content items as having the second video content item representing the hockey game because the item has the highest quality score of the second group.

After video ingest system 304 has identified the third group of video content items, video ingest system 304 can transmit the video content items of the third group to DVE system 306. In some examples, video ingest system 304 can output a ranked order of the third group of video content items based on their quality scores. In some examples, video ingest system 304 can also output the quality scores of the third group of video content items to the DVE system 304 and/or the sequencing system 308.

Video ingest system 304 can also select a DVE template. In one example, the DVE template may be selected based on the number of video content items in the third group. For example, if the third group includes two video content items, a DVE template may be selected that is suitable for displaying two video content items (e.g., a template that facilitates two video content items being displayed side-by-side).

After video ingest system 304 selects a DVE template, video ingest system 304 can transmit an indication of the selection to DVE system 306 and/or sequencing system 310. In another example, the DVE template may be selected by DVE system 306 once video ingest system 304 has received the third group of video content items from video ingest system 304. In this case, DVE system 306 can transmit an indication of the selection to sequencing system 310.

DVE system 306 can then generate a video content item based on the selected DVE template and the video content items in the second group. In some embodiments, the generated video content item may include at least a portion of some of the video content items of the second group. In other embodiments, the generated video content item may include at least a portion of all of the video content items of the second group.

In some instances, the number of video content items received by the video sources can change. Likewise, the content of a given video content item can change. As such, video ingest system 304 can continuously or periodically perform the operations described above and can update the first, second, and/or third groups of video content items, and can modify the generated video content item, as appropriate.

For example, video ingest system 304 can filter and compare additional received video content items to the video content items in the second group, and based on that comparison, the video ingest system can update the second group of video content items to include one or more of the additional received video content items, if appropriate.

As another example, the system can stop receiving a video content item and can update the first and second groups of video content items accordingly. In other cases, an additional video content item received by video ingest system 304 can replace a video content item of the second group. For example, the third received video content item can replace the first video content item. The replacement can occur due to the third video content item becoming more similar to the second video content item than the first content item. In one example, this can result from an end-user moving from one event to another, or from one area of an event to another area of the event.

In each of these examples, video ingest system 304 can select a different DVE template, as appropriate. For example, in the case where the number of video content items in the second group changes from two to three, video ingest system 304 can select a DVE template that is suitable for displaying three video content items (instead of two). As a result, DVE system 306 can generate a video content item that includes at least a portion of the three video content items (instead of two).

In another example, video ingest system 304 can determine quality scores for the updated second group of video content items and can update the third group of video content items based on the updated quality scores (e.g., adding a third video content item of the hockey game to the third group of video content items due to a high quality score). Furthermore, the third group of video content items can be updated to remove a video content item. Other examples are possible.

By performing the operations described above, DVE system 306 can dynamically generate a video content item that has a fluctuating amount and position of video content item subparts, based on how many received video content items are covering the same event and/or based on the quality of those video content items.

In some instances, video ingest system 304 can perform the scoring-related functionality discussed above without first grouping video content items based on the video content items having a threshold extent of similarity. As such, in one example, video ingest system 304 can receive a first group of video content items, and can identify from among the first group of video content items, a second group of video content items each having a quality score that exceeds a quality score threshold. Further, based on the identifying, video ingest system 304 can use at least a portion of at least one video content item of the identified second group to generate a video content item.

DVE system 306 can perform various acts and/or functions related to DVEs. For example, DVE system 306 can execute a DVE, thereby causing DVE system 306 to generate video content, and can transmit the video content to VBS 204.

In one example, DVE system 306 can receive first video content, and can generate second video content by modifying the first video content in accordance with a DVE template. As such, DVE system 306 can generate video content by modifying other video content.

DVE system 306 can modify video content in various ways, such as by overlaying text, images, video, and/or other content thereon. For example, DVE system 306 can modify video content by overlaying, on a lower right-hand corner region of the video content, a channel logo. As another example, DVE system 306 can modify video content by overlaying, on a lower-third region of the video content, a text box including text. As another example, DVE system 306 can modify video content by scaling or re-positioning the video content or a portion thereof.

Figure 4A:
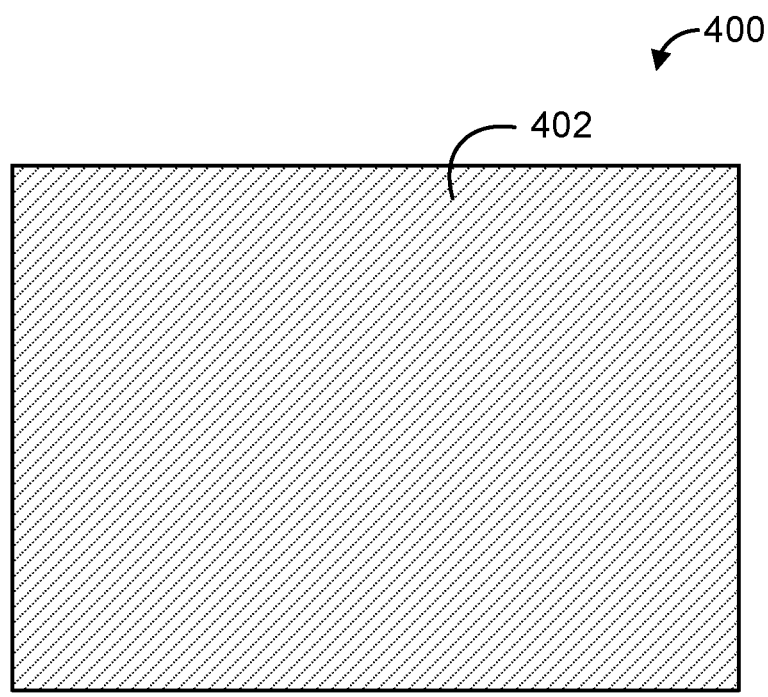
FIG. 4A is a simplified diagram of an example frame of video content, without content overlaid thereon.
Figure 4B:
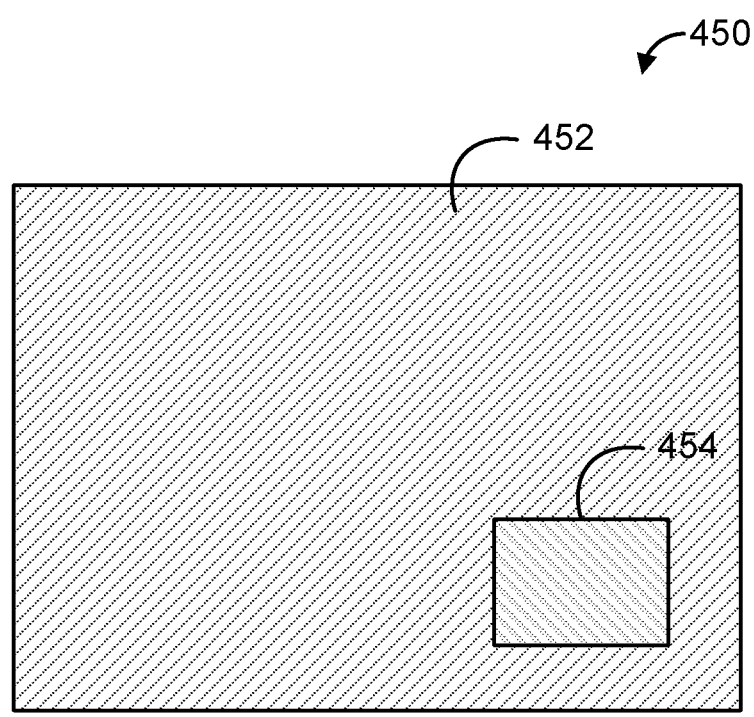
FIG. 4B is a simplified diagram of an example frame of video content, with content overlaid thereon.

FIGS. 4A and 4B help illustrate the concept of overlaying content on video content. FIG. 4A is a simplified depiction of an example frame 400 of video content. Frame 400 includes content 402, but does not include content overlaid on content 402. For comparison, FIG. 4B is a simplified depiction of another example frame 450 of video content. Frame 450 includes content 452 and content 454 overlaid on content 452.

In another example, DVE system 306 can execute a DVE which causes DVE system 306 to combine multiple input video content items into a single, generated video content item. DVE system 306 can use a DVE template to specify how many input video content items will be part of the generated single video content item. The DVE template can also specify where the input video content items will be positioned within the generated video content item. For example, one DVE template can specify that two input video content items are to be positioned side-by-side. In another example, a DVE template can specify that two input video content items are to be positioned side-by-side, and that a third video content item is to be positioned above the side-by-side video content items, for a total of three input video content items. Various other types of DVE templates are also possible.

In practice, DVE system 306 can switch between one or more inputs as appropriate, perhaps to receive and use video content in connection with DVE system 306 generating a video content item based on a given DVE template.

DVE system 306 can also perform other acts and/or functions. For example, DVE system 306 can create and/or edit DVE templates, perhaps based on input received from a user via a user interface. When DVE system 306 creates a DVE template, DVE system 306 can generate and store corresponding program instructions for later retrieval and execution. As such, the act of DVE system 306 using a DVE template can include DVE system 306 retrieving and executing program instructions corresponding to the DVE template.

Scheduling system 308 can perform acts and/or functions related to scheduling and/or managing video content production. For example, scheduling system 308 can create and/or edit a program schedule of a video program, perhaps based on input received from a user via a user interface. Sequencing system 310 can then process records in the program schedule. This can cause sequencing system 310 to control one or more other components of VPS 202 to facilitate VPS 202 generating and/or outputting video content, which can serve as or be part of a video program. As such, based on a program schedule, sequencing system 310 can control video source 302, video ingest system 304, and/or DVE system 306.

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. Each record can include various types of data.

FIG. 5 is a simplified diagram of an example program schedule 500. Program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE template identifier.

In some instances, a video content item consists of logically-related video content. For instance, a video content item can be a commercial or a portion of a television show that is scheduled between two commercial breaks.

As shown in FIG. 5, the first record specifies a story title of STORY A, a video content identifier of VS ID A, a duration of 00:02:00:00 (in hours::minutes::seconds::frames format), and a DVE template identifier of DVE ID A. As such, upon sequencing system 310 processing the first record, sequencing system 310 can cause video source 302 to playout a video content item identified by the identifier VS ID A for two minutes, and further can cause DVE system 306 to overlay content on the identified video content item, based on the DVE template identified by the identifier DVE ID A.

As another example, the third record specifies a story title of STORY C, a duration of 00:00:30:00, and a DVE identifier of DVE ID C. As such, upon sequencing system 310 processing the third record, sequencing system 310 can cause DVE system 306 to generate and output a video content item (in the form of a "full screen" DVE) for two minutes, based on the DVE template identified by the identifier DVE ID C.

In some instances, a record can correspond to a video content item generated based on the operations discussed above in connection with video ingest system 304 and DVE system 306. In this case, the record can include a special identifier indicating that this is the case. For example, the fifth record specifies a story title of STORY E, video content identifier of VS ID*, a duration of 00:00:30:00, and a DVE identifier of DVE ID*. The video content identifier of VS ID* and the DVE identifier ID* indicate that the relevant video content items and DVE template are variable, and may depend on the operation of video ingest system 304. As such, upon sequencing system 310 processing the fifth record, sequencing system 310 can cause DVE system 306 to use the DVE template most recently selected by video ingest system 304, and the video content items in the second group, to generate and output a video content item.

It should be noted that program schedule 500 has been greatly simplified for the purposes of illustrating certain features. In practice, a program schedule is likely to include significantly more data.

In some instances, sequencing system 310 can be configured to process a next record in the program schedule based on a trigger event. In one example, the trigger event can include sequencing system 310 receiving input from a user via a user interface.

VBS 204 can transmit video content to destination device 206 for presentation of the video content to an end user. In practice, VBS 204 can transmit video content to a large number of end-user devices for presentation of the video content to a large number of end users. VBS 204 can transmit video content to destination device 206 in various ways. For example, VBS 204 can transmit video content to destination device 206 over-the-air or via a packet-based network such as the Internet.

Destination device 206 can receive video content from VBS 204, and can present the video content to an end-user via a user interface.

Figure 6:
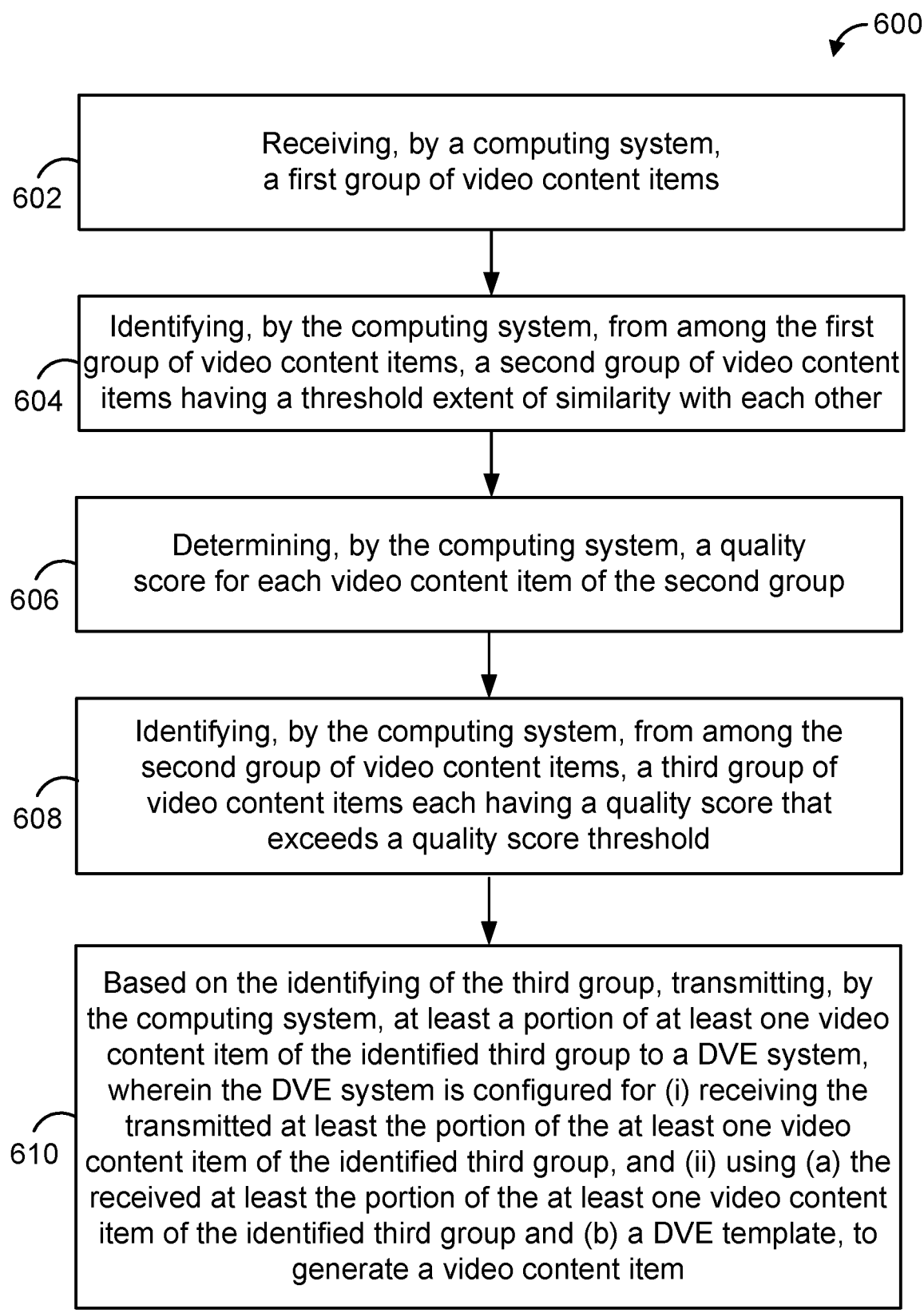
FIG. 6 is a flow chart of an example method.

FIG. 6 is a flow chart illustrating an example method 600. In some embodiments, the method 600 may include more, fewer, and/or different steps than those displayed in FIG. 6.

At block 602, method 600 can include receiving, by a computing system, a first group of video content items.

At block 604, method 600 can include identifying, by the computing system, from among the first group of video content items, a second group of video content items having a threshold extent of similarity with each other.

At block 606, method 600 can include determining, by the computing system, a quality score for each video content item of the second group.

At block 608, method 600 can include identifying, by the computing system, from among the second group of video content items, a third group of video content items each having a quality score that exceeds a quality score threshold.

At block 610, method 600 can include based on the identifying of the third group, transmitting, by the computing system, at least a portion of at least one video content item of the identified third group to a DVE system, wherein the DVE system is configured for (i) receiving the transmitted at least the portion of the at least one video content item of the identified third group, and (ii) using (a) the received at least the portion of the at least one video content item of the identified third group and (b) a DVE template, to generate a video content item.

Figure 7:
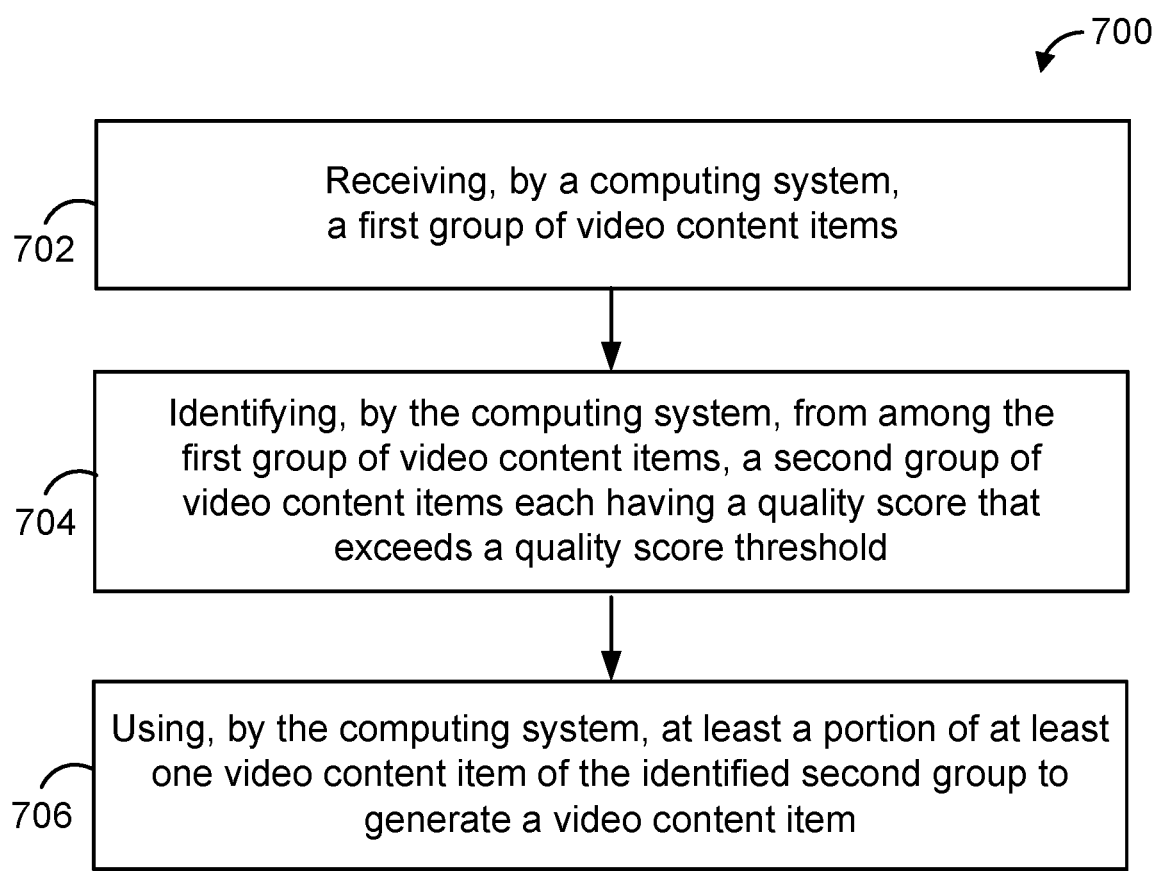
FIG. 7 is a flow chart of an example method.

FIG. 7 is a flow chart illustrating an example method 700. In some embodiments, the method 700 may include more, fewer, and/or different steps than those displayed in FIG. 7.

At block 702, method 700 can include receiving, by a computing system, a first group of video content items.

At block 704, method 700 can include identifying, by the computing system, from among the first group of video content items, a second group of video content items each having a quality score that exceeds a quality score threshold.

At block 706, method 700 can include based on the identifying, using, by the computing system, at least a portion of at least one video content item of the identified second group to generate a video content item.

IV. Example Variations

Although some of the acts and/or functions described in this disclosure have been described as being performed by a particular entity, such acts and/or functions can be performed by any entity, such as those entities described in this disclosure. Further, although the described acts and/or functions have been recited in a particular order, the acts and/or functions need not be performed in the order recited. However, in some instances, it can be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A non-transitory computer-readable medium having stored thereon program instructions that, upon execution by a processor, cause performance of a set of acts comprising:
    receiving, by a computing system, a first group of video content items;
    identifying, by the computing system, from among the first group of video content items, a second group of video content items having a threshold extent of similarity with each other;
    determining, by the computing system, a quality score for each video content item of the second group;
    identifying, by the computing system, from among the second group of video content items, a third group of video content items each having a quality score that exceeds a quality score threshold; and
    based on the identifying of the third group, using, by the computing system, at least a portion of at least one video content item of the identified third group and a digital video effect (DVE) template to generate a video content item.

2. The non-transitory computer-readable medium of claim 1, wherein the act of identifying the second group of video content items comprises:
    comparing, by the computing system, a fingerprint of a video content item of the first group with a fingerprint of a video content item of the second group;
    based on the comparison, determining, by the computing system, that the video content item of the first group and the video content item of the second group have the threshold extent of similarity with each other; and
    adding, by the computing system, the video content item of the first group to the second group.

3. The non-transitory computer-readable medium of claim 1, wherein the act of identifying the second group of video content items comprises:
    comparing, by the computing system, metadata of a video content item of the first group with metadata of a video content item of the second group;
    based on the comparison, determining, by the computing system, that the video content item of the first group and the video content item of the second group have the threshold extent of similarity with each other; and
    adding, by the computing system, the video content item of the first group to the second group.

4. The non-transitory computer-readable medium of claim 1, wherein the quality score corresponds to a video stability rating.

5. The non-transitory computer-readable medium of claim 1, wherein the set of acts further comprises:
    adjusting the quality score threshold such that the third group only contains one video content item having a highest quality score of all of the video content items of the second group.

6. The non-transitory computer-readable medium of claim 1, wherein the set of acts further comprises:
    broadcasting, by the computing system, the generated video content item, wherein at least one of the third group of video content items of the generated video content item is broadcast within 10 seconds from when the third group video content item was received by the computing system.

7. A computing system comprising:
    one or more processors; and a non-transitory computer-readable medium having stored thereon program instructions that, upon execution by the one or more processors, cause performance of a set of acts comprising:

receiving, by the computing system, a first group of video content items;

identifying, by the computing system, from among the first group of video content items, a second group of video content items having a threshold extent of similarity with each other;

determining, by the computing system, a quality score for each video content item of the second group;

identifying, by the computing system, from among the second group of video content items, a third group of video content items each having a quality score that exceeds a quality score threshold; and based on the identifying of the third group, using, by the computing system, at least a portion of at least one video content item of the identified third group and a digital video effect (DVE) template to generate a video content item.

8. The computing system of claim 7, wherein the act of identifying the second group of video content items comprises:

comparing, by the computing system, a fingerprint of a video content item of the first group with a fingerprint of a video content item of the second group;

based on the comparison, determining, by the computing system, that the video content item of the first group and the video content item of the second group have the threshold extent of similarity with each other; and adding, by the computing system, the video content item of the first group to the second group.

9. The computing system of claim 7, wherein the act of identifying the second group of video content items comprises:

comparing, by the computing system, metadata of a video content item of the first group with metadata of a video content item of the second group;

based on the comparison, determining, by the computing system, that the video content item of the first group and the video content item of the second group have the threshold extent of similarity with each other; and adding, by the computing system, the video content item of the first group to the second group.

10. The computing system of claim 7, wherein the quality score corresponds to a video stability rating.

11. The computing system of claim 7, wherein the set of acts further comprises:

adjusting the quality score threshold such that the third group only contains one video content item having a highest quality score of all of the video content items of the second group.

12. The computing system of claim 7, wherein the set of acts further comprises:

broadcasting, by the computing system, the generated video content item, wherein at least one of the third group of video content items of the generated video content item is broadcast within 10 seconds from when the third group video content item was received by the computing system.

13. A non-transitory computer-readable medium having stored thereon program instructions that, upon execution by a processor, cause performance of a set of acts comprising:

receiving, by a computing system, a first group of video content items;

determining, by the computing system, a quality score for each video content item of the first group;

identifying, by the computing system, from among the first group of video content items, a second group of video content items each having a quality score that exceeds a quality score threshold;

identifying, by the computing system, from among the second group of video content items, a third group of video content items having a threshold extent of similarity with each other; and based on the identifying of the third group, using, by the computing system, at least a portion of at least one video content item of the identified third group and a digital video effect (DVE) template to generate a video content item.

14. The non-transitory computer-readable medium of claim 13, wherein the act of identifying the third group of video content items comprises:

comparing, by the computing system, a fingerprint of a video content item of the second group with a fingerprint of a video content item of the third group;

based on the comparison, determining, by the computing system, that the video content item of the second group and the video content item of the third group have the threshold extent of similarity with each other; and adding, by the computing system, the video content item of the second group to the third group.

15. The non-transitory computer-readable medium of claim 13, wherein the act of identifying the third group of video content items comprises:

comparing, by the computing system, metadata of a video content item of the second group with metadata of a video content item of the third group;

based on the comparison, determining, by the computing system, that the video content item of the second group and the video content item of the third group have the threshold extent of similarity with each other; and adding, by the computing system, the video content item of the second group to the third group.

16. The non-transitory computer-readable medium of claim 13, wherein the quality score corresponds to a video stability rating.

17. The non-transitory computer-readable medium of claim 13, wherein the set of acts further comprises:

broadcasting, by the computing system, the generated video content item, wherein at least one of the third group of video content items of the generated video content item is broadcast within 10 seconds from when the third group video content item was received by the computing system.

18. A computing system comprising:

one or more processors; and a non-transitory computer-readable medium having stored thereon program instructions that, upon execution by the one or more processors, cause performance of a set of acts comprising:

receiving, by a computing system, a first group of video content items;

determining, by the computing system, a quality score for each video content item of the first group;

identifying, by the computing system, from among the first group of video content items, a second group of video content items each having a quality score that exceeds a quality score threshold;

identifying, by the computing system, from among the second group of video content items, a third group of video content items having a threshold extent of similarity with each other; and based on the identifying of the third group, using, by the computing system, at least a portion of at least one video content item of the identified third group and a digital video effect (DVE) template to generate a video content item.

19. The computing system of claim 18, wherein the act of identifying the third group of video content items comprises:

comparing, by the computing system, a fingerprint of a video content item of the second group with a fingerprint of a video content item of the third group;

based on the comparison, determining, by the computing system, that the video content item of the second group and the video content item of the third group have the threshold extent of similarity with each other; and adding, by the computing system, the video content item of the second group to the third group.

20. The computing system of claim 18, wherein the act of identifying the third group of video content items comprises:

comparing, by the computing system, metadata of a video content item of the second group with metadata of a video content item of the third group;

based on the comparison, determining, by the computing system, that the video content item of the second group and the video content item of the third group have the threshold extent of similarity with each other; and adding, by the computing system, the video content item of the second group to the third group.

21. The computing system of claim 18, wherein the quality score corresponds to a video stability rating.

22. The computing system of claim 18, wherein the set of acts further comprises:

broadcasting, by the computing system, the generated video content item, wherein at least one of the third group of video content items of the generated video content item is broadcast within 10 seconds from when the third group video content item was received by the computing system.

* * * * *